(12) United States Patent
Kim et al.

(10) Patent No.: US 12,366,541 B2
(45) Date of Patent: Jul. 22, 2025

(54) SAMPLE HOLDER FOR X-RAY DIFFRACTION ANALYSIS AND X-RAY DIFFRACTION ANALYSIS METHOD USING THE SAME

(71) Applicants: Hyundai Motor Company, Seoul (KR); Kia Corporation, Seoul (KR); Korea Institute of Science and Technology, Seoul (KR)

(72) Inventors: Yun Sung Kim, Gyeonggi-do (KR); Yoon Kwang Lee, Gyeonggi-do (KR); Ga Hyeon Im, Gyeonggi-do (KR); Sang Heon Lee, Gyeonggi-do (KR); Kyu Joon Lee, Seoul (KR); Jae Pyoung Ahn, Seoul (KR); Hae Ryoung Kim, Seoul (KR); Hyun Woo Gong, Seoul (KR); Byeong Hyeon Lee, Seoul (KR)

(73) Assignees: Hyundai Motor Company, Seoul (KR); Kia Corporation, Seoul (KR); Korea Institute of Science and Technology, Seoul (KR)

( * ) Notice: Subject to any disclaimer, the term of this patent is extended or adjusted under 35 U.S.C. 154(b) by 270 days.

(21) Appl. No.: 18/078,930

(22) Filed: Dec. 10, 2022

(65) Prior Publication Data
US 2024/0044818 A1 Feb. 8, 2024

(30) Foreign Application Priority Data
Aug. 3, 2022 (KR) .................. 10-2022-0096707

(51) Int. Cl.
*G01N 23/20025* (2018.01)

(52) U.S. Cl.
CPC .............. *G01N 23/20025* (2013.01)

(58) Field of Classification Search
None
See application file for complete search history.

(56) References Cited

U.S. PATENT DOCUMENTS

| 4,821,303 A * | 4/1989 | Fawcett ............ G01N 23/207 |
| | | 378/80 |
| 8,019,048 B2 | 9/2011 | Sikora et al. |

(Continued)

FOREIGN PATENT DOCUMENTS

| JP | H09-208308 A | 8/1997 |
| JP | 11-006805 A | 1/1999 |

(Continued)

OTHER PUBLICATIONS

KR20130067120A English translation of Description (Year: 2013).*

*Primary Examiner* — David J Makiya
*Assistant Examiner* — Miya Downing
(74) *Attorney, Agent, or Firm* — Fox Rothschild LLP

(57) ABSTRACT

Disclosed are a sample holder for X-ray diffraction analysis and an X-ray diffraction analysis method using the same. The sample holder for X-ray diffraction analysis includes a housing part formed of a side wall and a bottom plate with an open upper portion thereof, the housing part including an inner space partitioned from the side wall and the bottom plate, a cover part configured to cover the upper portion of the housing part and to allow X-rays to pass therethrough, and a support part installed to be movable upwards and downwards in the inner space, the support part including a plate-shaped substrate having a predetermined area, the substrate having a sample placed thereon.

10 Claims, 11 Drawing Sheets

(56) References Cited

U.S. PATENT DOCUMENTS

| | | | |
|---|---|---|---|
| 10,330,611 B2 | 6/2019 | Kim et al. | |
| 2014/0093052 A1* | 4/2014 | Chupas | G01N 23/20025 |
| | | | 378/208 |
| 2022/0320575 A1* | 10/2022 | Yoo | H01M 4/131 |

FOREIGN PATENT DOCUMENTS

| | | | |
|---|---|---|---|
| JP | H11-132977 A | | 5/1999 |
| KR | 1999-0075742 A | | 10/1999 |
| KR | 10-0802604 B1 | | 2/2008 |
| KR | 10-0886357 B1 | | 3/2009 |
| KR | 20130067120 A | * | 6/2013 |
| KR | 10-2015-0095548 A | | 8/2015 |
| KR | 10-2021-0112238 A | | 9/2021 |

* cited by examiner

SAMPLE HOLDER FOR X-RAY DIFFRACTION ANALYSIS AND X-RAY DIFFRACTION ANALYSIS METHOD USING THE SAME

CROSS-REFERENCE TO RELATED APPLICATION

This application claims, under 35 U.S.C. § 119(a), the benefit of priority from Korean Patent Application No. 10-2022-0096707, filed on Aug. 3, 2022, the entire contents of which are incorporated herein by reference.

BACKGROUND

(a) Technical Field

The present disclosure relates to a sample holder for X-ray diffraction analysis and an X-ray diffraction analysis method using the same.

(b) Background Art

Secondary batteries capable of being recharged and discharged are used not only in small electronic devices such as a mobile phone and a laptop, but also in large transportation means such as a hybrid vehicle and an electric vehicle. Accordingly, it is required to develop secondary batteries having higher stability and energy density.

Most of the secondary batteries of the related art are formed of cells based on organic solvents (organic liquid electrolytes), and thus have limitations in improving stability and energy density.

Meanwhile, all-solid-state batteries using solid electrolytes are made based on a technique excluding organic solvents, and can manufacture cells in a safer and simpler form, thereby having recently gained a lot of popularity.

Solid electrolytes are divided into oxide-based solid electrolytes and sulfide-based solid electrolytes. Compared to oxide-based solid electrolytes, sulfide-based solid electrolytes have advantages of high lithium-ion conductivity and stability over a wide voltage range. However, sulfide-based solid electrolytes have disadvantages in that the same are significantly sensitive to moisture and generates toxic hydrogen sulfide ($H_2S$) gas upon reaction with moisture, and lithium ion conductivity drops sharply.

Therefore, in order to perform analysis of all-solid-state batteries containing sulfide-based solid electrolytes, the same should not be exposed to the atmosphere, and particularly, should be shielded from moisture.

An X-ray diffraction analysis apparatus of the related art seals a specific space having a sample placed therein to prevent the sample from being exposed to the atmosphere. However, since it is difficult to continuously seal the specific space during the long measurement time of the micro X-ray diffraction analysis apparatus, the reliability of measurement results deteriorates.

Meanwhile, in micro-X-ray diffraction analysis, the sample is required to be placed at a designated accurate analysis point because the size of an incident beam is small. The position of the X-Y axis can be controlled by moving an apparatus, but it is difficult to adjust the position of the Z-axis using an apparatus of the related art.

The above information disclosed in this Background section is only for enhancement of understanding of the background of the disclosure, and therefore it may contain information that does not form the prior art that is already known in this country to a person of ordinary skill in the art.

SUMMARY OF THE DISCLOSURE

The present disclosure has been made in an effort to address the above-described problems associated with the prior art, and it is an object of the present disclosure to provide a sample holder for X-ray diffraction analysis capable of accurately disposing a sample at a desired position and an X-ray diffraction analysis method using the same.

It is another object of the present disclosure to provide a sample holder for X-ray diffraction analysis capable of analyzing a sample vulnerable to the atmosphere and/or moisture for a long time, and an X-ray diffraction analysis method using the same.

The objects of the present disclosure are not limited to the above-mentioned objects. The objects of the present disclosure will be further clarified by the following description, and will be realized by means of the elements and combinations thereof pointed out in the appended claims.

In one aspect, the present disclosure provides a sample holder for X-ray diffraction analysis, the sample holder including a housing part formed of a side wall and a bottom plate with an open upper portion thereof, the housing part including an inner space partitioned from the side wall and the bottom plate, a cover part configured to cover the upper portion of the housing part and to allow X-rays to pass therethrough; and a support part configured to be movable upwards and downwards in the inner space, the support part including a substrate portion having a shape of a plate with a predetermined area, the substrate portion being configured to receive a sample placed thereon.

In a preferred embodiment, the cover part may include a polyimide film.

In another preferred embodiment, the side wall may include a placement groove recessed at a predetermined depth, the placement groove being formed in an upper edge of the side wall, and the sample holder may further include a coupling part coupled to the placement groove and being configured to shield the inner space, wherein the cover part may be interposed between the coupling part and the placement groove.

In still another preferred embodiment, the sample holder may further include a first sealing member positioned between the placement groove and the coupling part.

In yet another preferred embodiment, the support part may include a head member configured to support the substrate, and a shaft member having a rod like shape extending in a longitudinal direction from a first end to a second, wherein the first end is connected to a lower portion of the head member and the second end is inserted into a coupling groove recessed in the bottom plate or formed to penetrate the bottom plate.

In still yet another preferred embodiment, the shaft member may be screw-coupled to the coupling groove, thereby enabling the support part to be movable upwards and downwards.

In a further preferred embodiment, the coupling groove may be formed to penetrate the bottom plate, the shaft member may be exposed to the outside through the coupling groove, the shaft member may further include a plurality of holes formed therethrough in a direction perpendicular to the longitudinal axis of the shaft member, and the sample holder may further include a fixing part coupled to at least one hole of the plurality of holes of the shaft member to thereby fix the shaft member.

In another further preferred embodiment, the sample holder may further include a gas inlet configured to have one end passing through one side of the side wall to communicate with the inner space, the gas inlet being configured to provide gas to the inner space, and a gas outlet configured to have one end passing through the other side of the side wall to communicate with the inner space, the gas outlet being configured to discharge the gas of the inner space to the outside.

In still another further preferred embodiment, the sample holder may further include a second sealing member positioned at a connection portion between the gas inlet and the side wall, and a third sealing member positioned at a connection portion between the gas outlet and the side wall.

In another aspect, the present disclosure provides an X-ray diffraction analysis method including placing a sample on the support part, adjusting a height of the support part so that a surface of the sample is in contact with an inner surface of the cover part, generating a flow of an inert gas in the inner space by allowing the inert gas to flow into the gas inlet and discharging the inert gas through the gas outlet, and irradiating the sample with an incident beam.

In a preferred embodiment, the sample may include an electrochemical cell, wherein the electrochemical cell may be placed on the support part so that a plane or a cross-section of the electrochemical cell faces an upper side of the sample holder.

In another preferred embodiment, a size of the incident beam may be 50 μm to 800 μm.

Other aspects and preferred embodiments of the disclosure are discussed infra.

The above and other features of the disclosure are discussed infra.

BRIEF DESCRIPTION OF THE DRAWINGS

The above and other features of the present disclosure will now be described in detail with reference to certain exemplary embodiments thereof illustrated in the accompanying drawings which are given hereinbelow by way of illustration only, and thus are not limitative of the present disclosure, and wherein.

Figure 1:
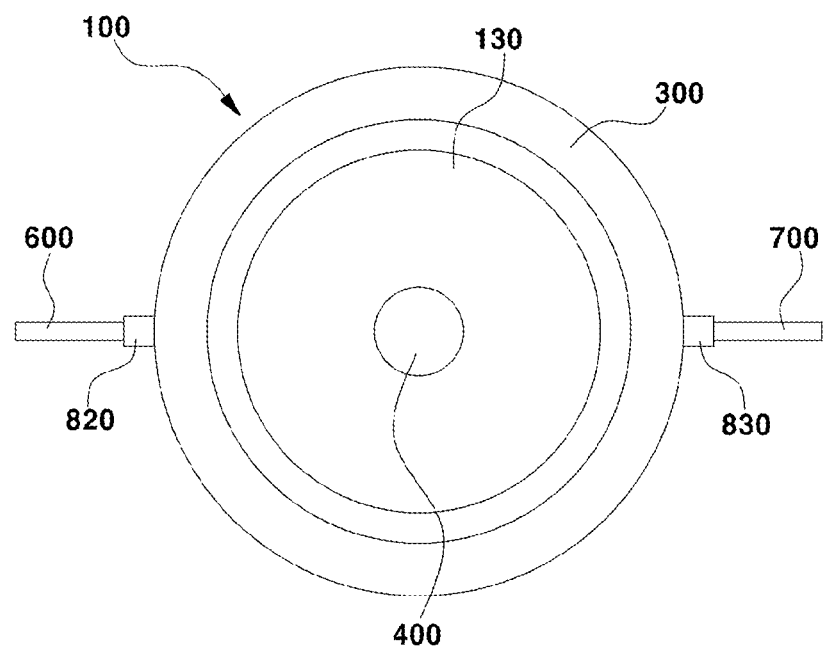
FIG. 1 shows a plan view of a sample holder for X-ray diffraction analysis according to the present disclosure.

It should be understood that the appended drawings are not necessarily to scale, presenting a somewhat simplified representation of various preferred features illustrative of the basic principles of the disclosure. The specific design features of the present disclosure as disclosed herein, including, for example, specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

The above objects, other objects, features, and benefits of the present disclosure will be easily understood through the following preferred embodiments associated with the accompanying drawings. However, the present disclosure is not limited to the embodiments described herein and may be embodied in other forms. Rather, these embodiments are provided so that this disclosure will be thorough and complete, and will fully convey the concept of the disclosure to those skilled in the art.

The same or similar components are denoted by the same reference numerals in describing each drawing. In the accompanying drawings, the dimensions of structures are enlarged from the actual dimensions thereof for clarity of the present disclosure. Terms such as "first", "second", and the like may be used herein to describe various components, but the components should not be limited by the terms. The terms are used only for the purpose of distinguishing one component from another component. For example, a first component may be referred to as a second component, and, similarly, a second component may be referred to as a first component without departing from the scope of the present disclosure. Singular forms are intended to include plural forms as well, unless the context clearly indicates otherwise.

It will be further understood that the terms "comprises", "includes", and/or "has", when used in this specification, specify the presence of stated features, integers, steps, operations, elements, components, or combinations thereof, but do not preclude the presence or addition of one or more other features, integers, steps, operations, elements, components, or combinations thereof. In addition, it will be understood that when an element such as a layer, film, region, or plate is referred to as being "on" another element, it can be directly on the other element or intervening elements may also be present. Conversely, it will also be understood that when an element such as a layer, film, region, or plate is referred to as being "under" another element, it can be directly under the other element or intervening elements may also be present.

Unless indicated otherwise, all numbers, values, and/or expressions referring to quantities of ingredients, reaction conditions, polymer compositions, and formulations used herein are to be understood as modified in all instances by the term "about" as such numbers are inherently approximations that are reflective of, among other things, the various uncertainties of measurement encountered in obtaining such values. Further, where a numerical range is disclosed herein, such range is continuous, and includes, unless indicated otherwise, every value from the minimum value up to and including the maximum value of such range. Still further, where such a range refers to integers, unless otherwise indicated, every integer from the minimum value up to and including the maximum value is included.

Figure 2:
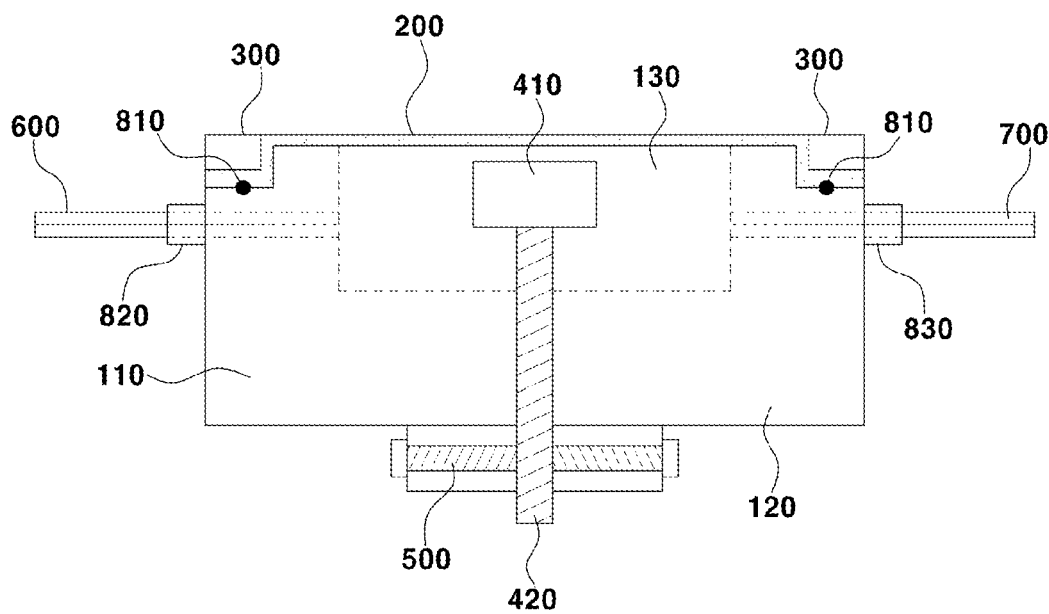
FIG. 2 shows a side view of an embodiment of the sample holder for X-ray diffraction analysis according to the present disclosure.

FIG. 1 shows a plan view of a sample holder for X-ray diffraction analysis according to the present disclosure. FIG. 2 shows a side view of an embodiment of the sample holder for X-ray diffraction analysis according to the present disclosure. Here, in order to facilitate understanding of the present disclosure, some configurations such as a head member 410 and a shaft member 420 that are not externally shown are shown with solid lines in FIG. 2.

The sample holder for X-ray diffraction analysis includes a housing part 100 formed of a side wall 110 and a bottom plate 120 with an open upper portion thereof, the housing part 100 including an inner space 130 partitioned from the side wall 110 and the bottom plate 120, a cover part 200 configured to cover the upper portion of the housing part 100 and to allow X-rays to pass therethrough, and a support part 400 installed to be movable upwards and downwards in the inner space 130, the support part 400 including a plate-shaped substrate having a predetermined area, the substrate having a sample placed thereon.

According to the present disclosure, since the support part 400 is installed to be vertically movable, samples having various sizes may be positioned at accurate analysis points. In addition, both the surface of the sample and the cross section thereof may be analyzed. Meanwhile, the present disclosure does not seal the inner space 130 but forms the flow of an inert gas in the inner space 130. Accordingly, the sample may be shielded from the atmosphere or moisture for a long measurement time. The above-described features will be described later.

Figure 3:
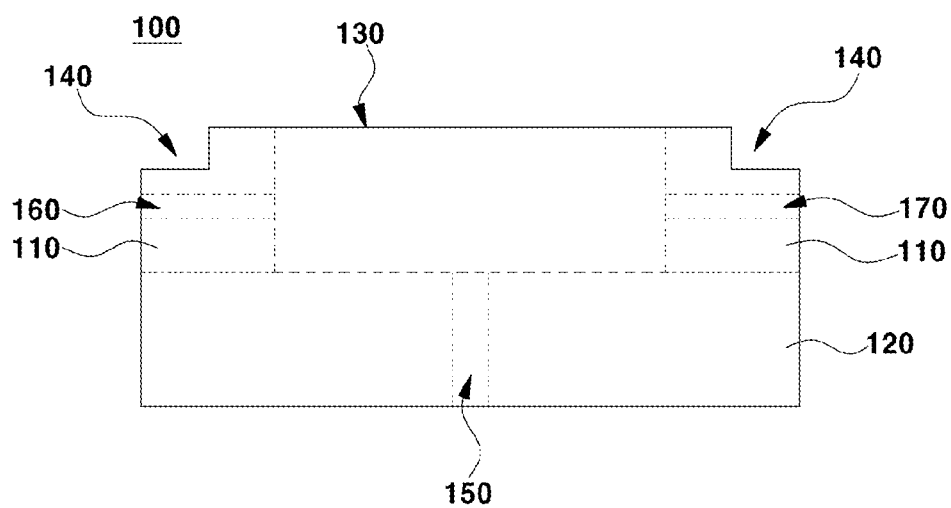
FIG. 3 shows a side view of a housing part according to the present disclosure.

FIG. 3 shows a side view of the housing part 100 according to the present disclosure. Referring to FIGS. 1 and 3, the housing part 100 may have a cylindrical shape. However, this cylindrical shape is formed for screw coupling between a shielding part 300 to be described later and the housing part 100, and the shape of the housing part 100 may be appropriately changed when a coupling method between the shielding part 300 and the housing part 100 is changed.

The housing part 100 includes the side wall 110, the base plate 120, and the inner space 130 partitioned from the side wall 110 and the base plate 120, a placement groove 140 recessed at a predetermined depth in the upper edge of the side wall 110, a coupling groove 150 recessed in the bottom plate 120 or penetrated therethrough to accommodate the shaft member 420 to be described later, a first through hole 160 having a gas inlet 600 to be described later inserted thereinto, and a second through hole 170 having a gas outlet 700 to be described later inserted thereinto.

The cover part 200 covers the upper portion of the housing part 100 to disconnect the inner space 130 from the outside.

The cover part 200 may include any material allowing X-rays to pass therethrough, and may include, for example, a polyimide film.

The thickness of the cover part 200 is not particularly limited, and may be, for example, 20 μm or less, 10 μm or less, or 5 μm or less.

Referring to FIGS. 2 and 3, the sample holder may further include a coupling part 300 coupled to the placement groove 140 to shield the inner space 130. Here, the cover part 200 is interposed between the coupling part 300 and the placement groove 140.

The coupling groove 300 may be screw-coupled to the side wall of the placement groove 140. In this case, a first sealing member 810 may be inserted between the placement groove 140 and the coupling part 300, thereby sealing the inner space 130. The first sealing member 810 may include an O-ring.

Figure 4:
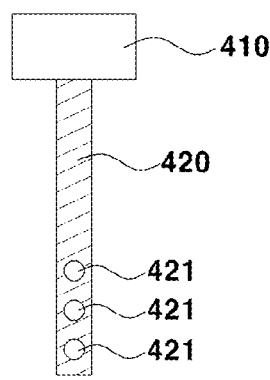
FIG. 4 shows an embodiment of a support part according to the present disclosure.

FIG. 4 shows an embodiment of the support part 400 according to the present disclosure. Referring to FIGS. 2 and 4, the support part 400 may include the head member 410 including a plate-shaped substrate having a predetermined area and the shaft member 420 having a rod shape, wherein the shaft member 420 has one end connected to a lower portion of the head member 410 and the other end inserted into the coupling groove 150 recessed in the bottom plate 120 or formed to penetrate the bottom plate 120. For example, the shaft member 420 may extend in a longitudinal direction from a first end connected to a lower portion of the head member 410 to a second end inserted into the coupling groove 150 recessed in the bottom plate 120 or formed to penetrate the bottom plate 120.

The shaft member 420 may be screw-coupled to the coupling groove 150. Accordingly, the z-axis position of the support part 400 may be adjusted by a screw line.

The shaft member 420 may include a plurality of holes 421 formed to penetrate the same in a direction perpendicular to the axis of the shaft member 420.

A part of the shaft member 420 is exposed to the outside of the housing part 100 through the coupling groove 150, and a fixing part 500 is coupled to any one of the plurality of holes 421, thereby fixing the position of the support part 400.

However, the method of fixing the support part 400 is not limited thereto. Any method can be adopted as long as the support part 400 can be prevented from moving when the sample is analyzed, and the configuration of the fixing part 500 or the like may not be provided.

Figure 5:
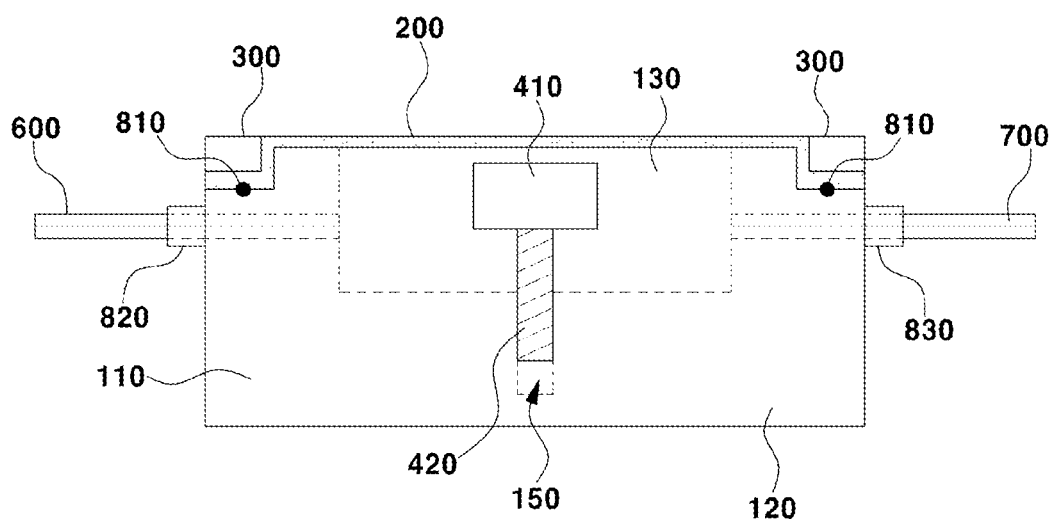
FIG. 5 shows a side view of another embodiment of the sample holder for X-ray diffraction analysis according to of the present disclosure.

Meanwhile, FIG. 5 shows a side view of another embodiment of the sample holder for X-ray diffraction analysis according to the present disclosure. Referring to FIG. 5, in the sample holder, the coupling groove 150 may be formed to be recessed in the bottom plate 120 at a predetermined depth without penetrating the same. In this case as well, the shaft member 420 may be inserted into the coupling groove 150 and coupled thereto by a screw line, and the height of the support part 400 may be adjusted by the screw line.

Referring to FIGS. 1 and 2, the sample holder may include the gas inlet 600 having one end passing through one side of the side wall 110 to communicate with the inner space 130, the gas inlet 600 being configured to provide gas to the inner space 130. The gas inlet 600 may be inserted into the housing part 100 through the first through hole 160.

The sample holder may include the gas outlet 700 having one end passing through the other side of the side wall 110 to communicate with the inner space 130, the gas outlet 700 being configured to discharge the gas of the inner space 130 to the outside. The gas outlet 700 may be inserted into the housing 100 through the second through hole 170.

In FIGS. 1 and 2, the gas inlet 600 and the gas outlet 700 are installed at symmetrical positions, but the positions thereof are not limited thereto. Here, if it is possible to generate the flow of gas in the inner space 130, the positions thereof may be appropriately adjusted.

A second sealing member 820 may be provided at a connection portion between the gas inlet 600 and the side wall 110. In addition, a third sealing member 830 may be provided at a connection portion between the gas outlet 700 and the side wall 110. The second sealing member 820 and the third sealing member 830 are configured to prevent gas in the inner space 130 from flowing out of the inner space 130.

Figure 6:
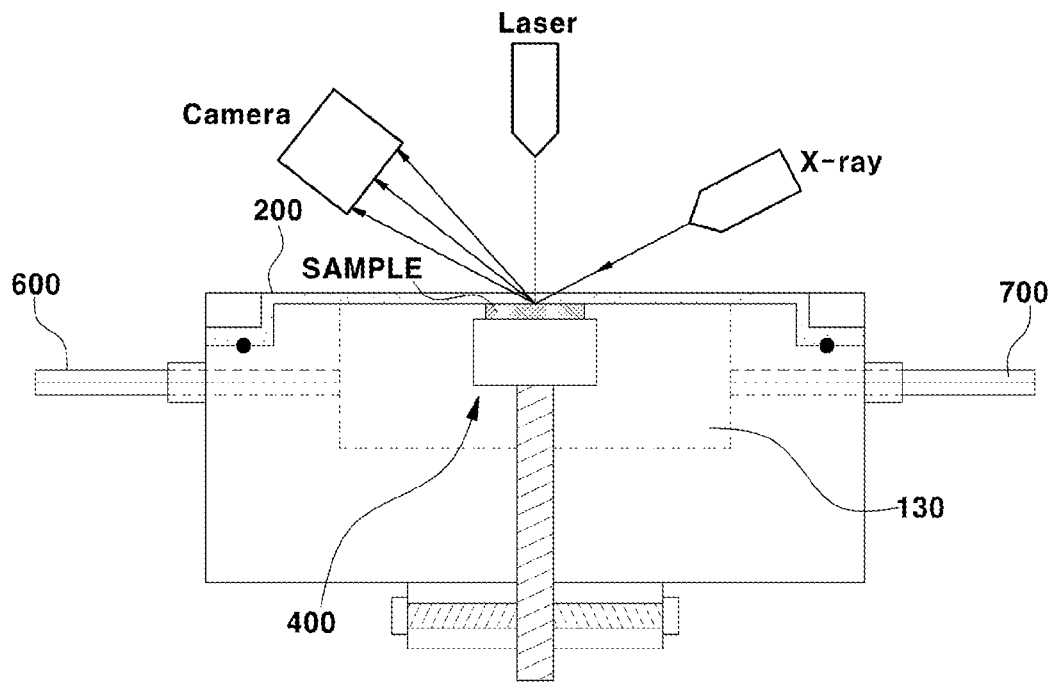
FIG. 6 shows a reference view of an X-ray diffraction analysis method using the sample holder according to the present disclosure.

FIG. 6 shows a reference view of an X-ray diffraction analysis method using the sample holder according to the present disclosure. The X-ray diffraction analysis method is performed by placing a sample on the support part 400, adjusting the height of the support part 400 so that the surface of the sample contacts the inner surface of the cover part 200, generating the flow of an inert gas in the inner space 130 by allowing the inert gas to flow into the gas inlet 600 and discharging the inert gas through the gas outlet 700, and irradiating the sample with an incident beam.

Figure 7:
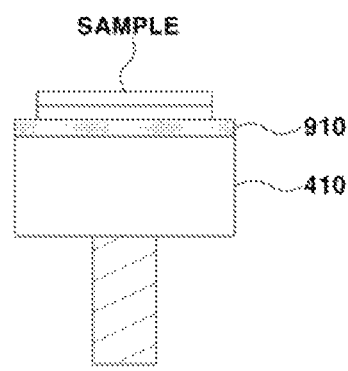
FIG. 7 shows a reference view of a method of analyzing the surface of a sample.

The sample may include an electrochemical cell. FIG. 7 shows a reference view of a method of analyzing the surface of a sample. First, an adhesive film 910 may be attached to the head member 410 to fix the sample. The adhesive film 910 is not particularly limited, and may include any adhesive material as long as the same does not affect the results of the X-ray diffraction analysis. For example, the adhesive film 910 may include a carbon tape. Thereafter, the surface of the sample may be attached to the adhesive film 910 so as to face the cover part 200.

Figure 8:
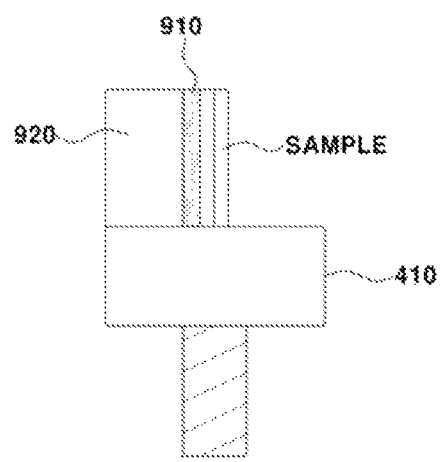
FIG. 8 shows a reference view of a method of analyzing the cross-section of the sample.

FIG. 8 shows a reference view of a method of analyzing the cross-section of the sample. An auxiliary stand 920 may be attached to the head member 410 through the adhesive film 910, and the sample may be attached to the head member 410 while being supported by the auxiliary stand 920 and the adhesive film 910 so that the cross-section thereof faces the cover part 200.

As described above, the sample may be placed on the support part 400, and the height of the support part 400 may be adjusted so that the upper surface of the sample is in contact with the inner surface of the cover part 200. As shown in FIG. 6, the incident beam containing X-rays is incident on the sample holder almost in the horizontal direction, thereby making it possible to maximize the analysis range of the sample.

Thereafter, the continuous flow of an inert gas is generated in the inner space 130 through the gas inlet 600 and the gas outlet 700, thereby making it possible to prevent the atmosphere and/or moisture from permeating the inner space 130. The inert gas may contain nitrogen ($N_2$), argon (Ar), or the like.

The sample may be irradiated with an incident beam. In this case, after the position of the sample to be analyzed by a laser is designated, the incident beam may be adjusted to the position.

The size of the incident beam is not particularly limited, and may be appropriately adjusted depending on the size of a desired analysis area. For example, the size of the incident beam may be 50 μm to 800 μm. Here, the size of the incident beam refers to the diameter of the incident beam emitted from an apparatus.

The incident beam passes through the sample and diffracted light is collected by a camera, thereby analyzing the result.

Other forms of the present disclosure will be described more specifically through the following embodiments. The following embodiments are only examples to aid in the understanding of the present disclosure, and the scope of the present disclosure is not limited thereto.

First Experimental Example

As a sample, a layered structure made of a sulfide-based solid electrolyte having an argyrodite-based crystal structure is prepared. X-ray diffraction analysis is performed on the sample using the sample holder as shown in FIG. 6. Here, results are analyzed by varying the size of the incident beam between 50 μm and 800 μm.

Figure 9A:
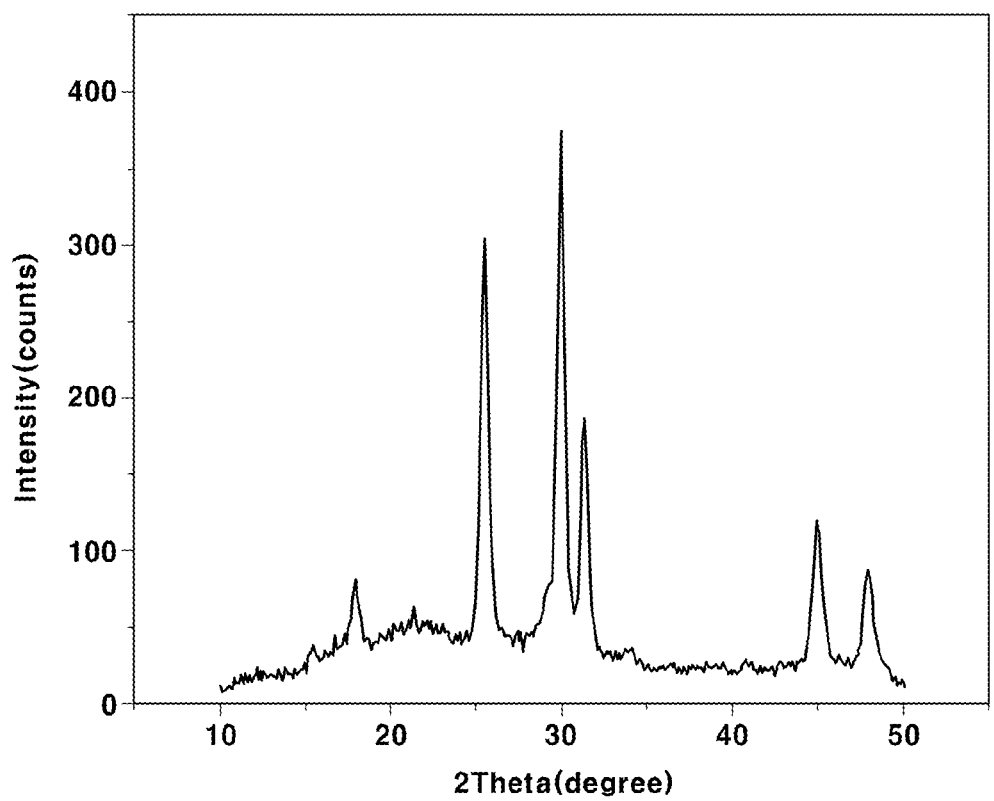
FIG. 9A shows a result of a first experimental example when the size of an incident beam is 800 μm.
Figure 9B:
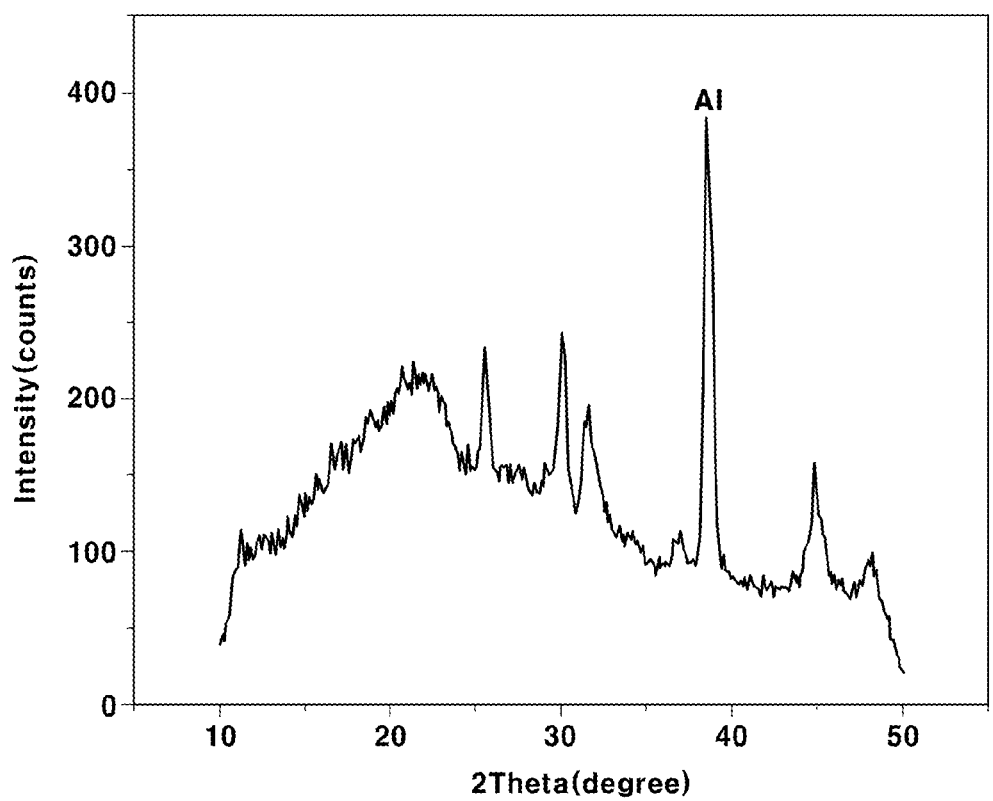
FIG. 9B shows a result of the first experimental example when the size of the incident beam is 50 μm.

FIG. 9A shows a result when the size of the incident beam is 50 μm. FIG. 9B shows a result when the size of the incident beam is 800 μm. When the size of the incident beam is 800 μm, the incident beam is larger than the sample. Accordingly, a peak caused by aluminum (Al), which is a material of the support part (to be precise, the head member), is detected. Meanwhile, when the size of the incident beam is 50 μm, to be precise, only a peak caused by the argyrodite-based crystal structure is detected.

Second Experimental Example

X-ray diffraction analysis is performed on the sample using the same sample and the same sample holder as in the first experimental example. The size of the incident beam is 800 μm, and the acquisition time is 180 seconds. Results are analyzed by varying the height of the support part.

Figure 10A:
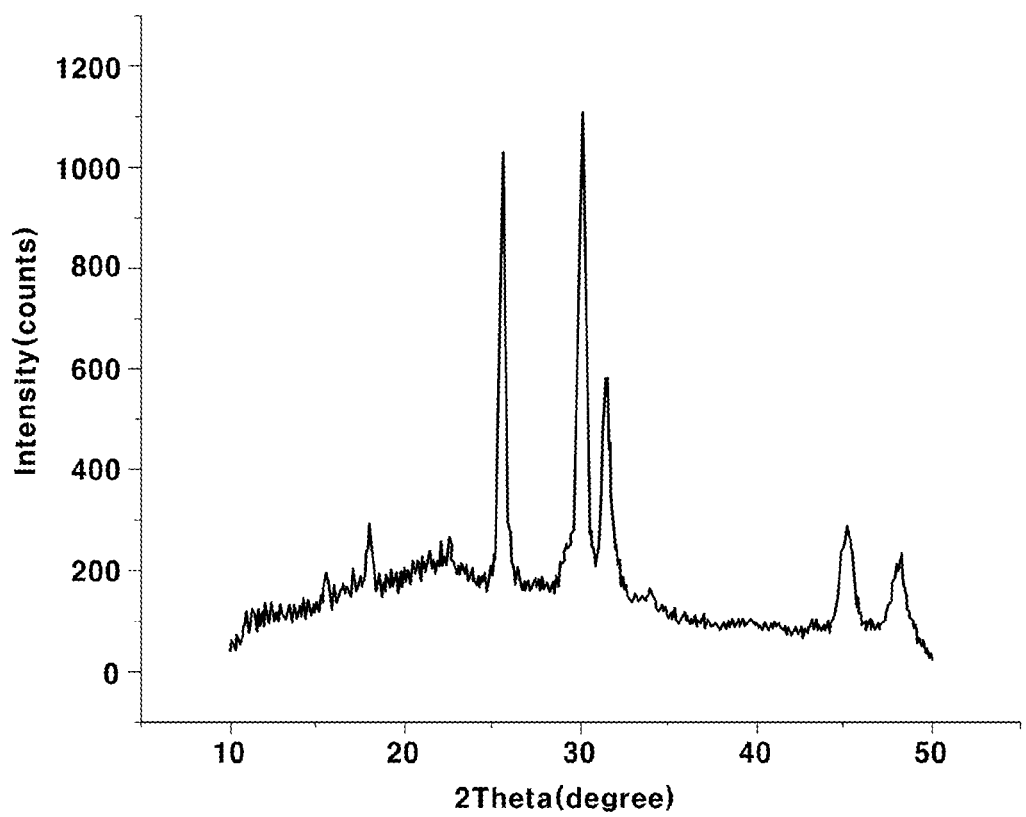
FIG. 10A shows a result of a second experimental example when the height of the support part is adjusted so that the surface of the sample is in contact with the inner surface of a cover part.
Figure 10B:
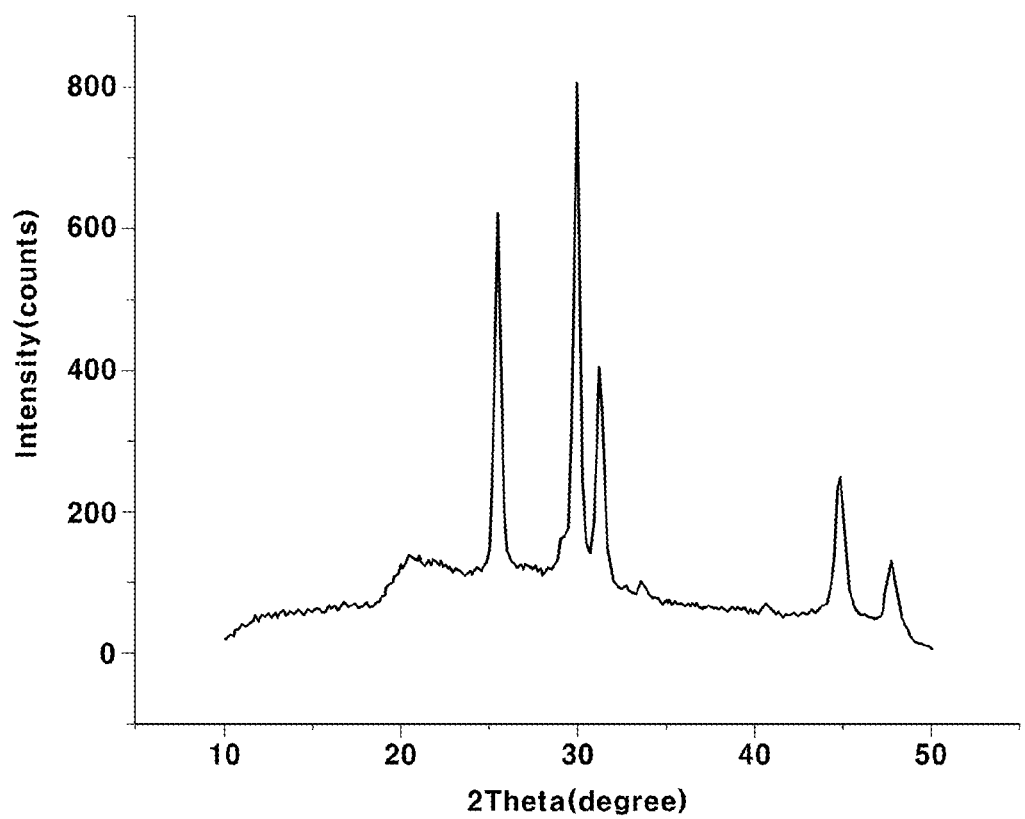
FIG. 10B shows a result of the second experimental example when the height of the support part is lowered.

FIG. 10A shows a result when the height of the support part is adjusted so that the surface of the sample is in contact with the inner surface of the cover part. FIG. 10B shows a result when the height of the support part is lowered. Referring to FIGS. 10A and 10B, when the surface of the sample is in contact with the inner surface of the cover part, it can be seen that peaks are clearly detected even in the low angle range at which 2θ is around 15° and 18°.

Third Experimental Example

X-ray diffraction analysis is performed on the sample using the same sample and the same sample holder as in the first experimental example. The size of the incident beam is 50 μm, and the acquisition time is 3 hours. If the size of the incident beam is small, the acquisition time should be increased. The atmosphere and/or moisture may affect the sample if the inner space is not perfectly sealed. Therefore, X-ray diffraction analysis is respectively performed in the case in which the flow of argon gas is generated in the sample holder and the case in which the inner space is only sealed with an O-ring, and results thereof are analyzed.

Figure 11A:
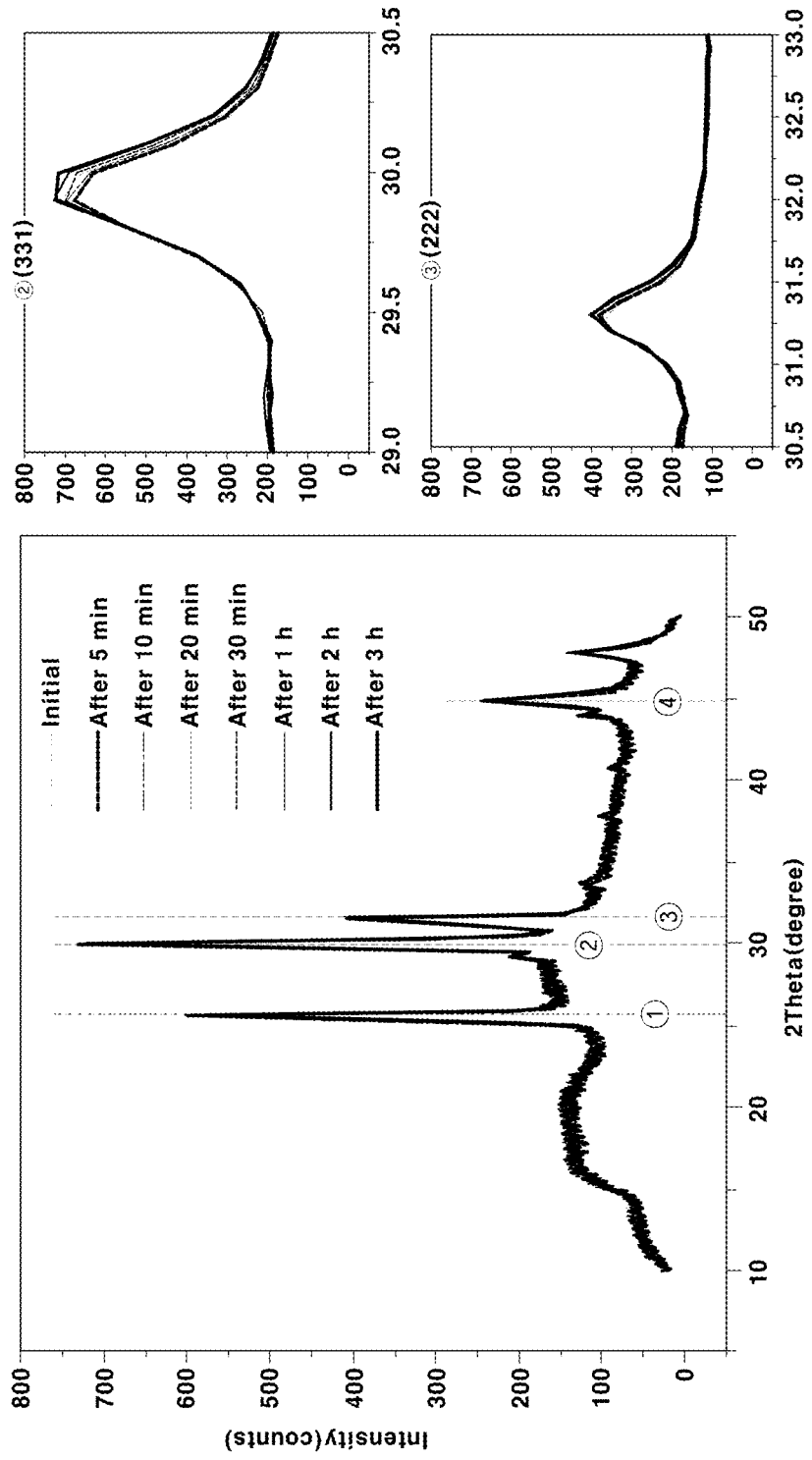
FIG. 11A shows a result of a third experimental example when the flow of argon gas is generated in the inner space through a gas inlet and a gas outlet and the sample is analyzed.
Figure 11B:
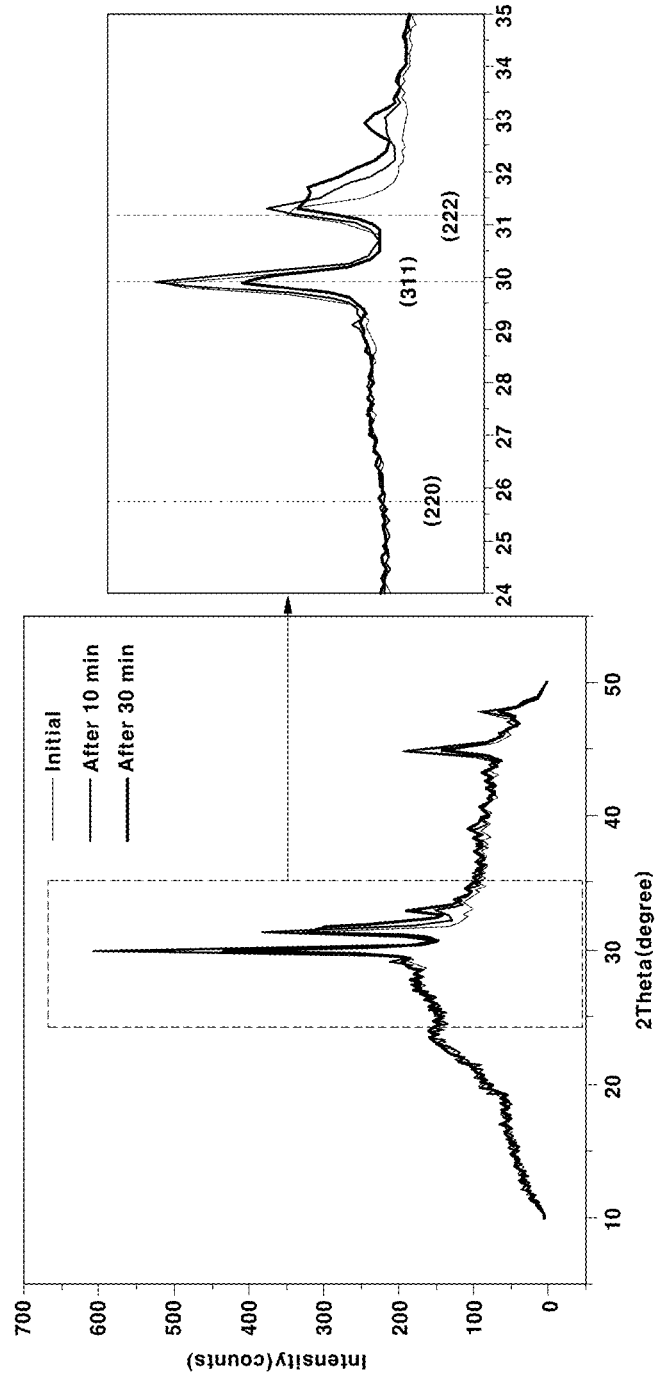
FIG. 11B shows a result of the third experimental example when the gas inlet and the gas outlet are sealed to generate argon gas atmosphere in the inner space and the sample is analyzed.

FIG. 11A shows a result of analyzing the sample when the flow of argon gas is generated in the inner space through the gas inlet and the gas outlet. FIG. 11B shows a result of analyzing the sample when the gas inlet and the gas outlet are sealed to generate an argon gas atmosphere in the inner space. Referring to FIG. 11B it can be seen that both peaks 311 and 222 caused by the argyrodite-based crystal structure deteriorate after 30 minutes. On the other hand, referring to FIG. 11A, no peak deterioration due to the argyrodite-based crystal structure is observed even after 3 hours have elapsed.

As is apparent from the above description, it is possible to obtain a sample holder for X-ray diffraction analysis capable of accurately placing a sample at a desired position, and an X-ray diffraction analysis method using the same.

Further, it is possible to obtain a sample holder for X-ray diffraction analysis capable of analyzing a sample vulnerable to the atmosphere and/or moisture for a long time, and an X-ray diffraction analysis method using the same.

The effects of the present disclosure are not limited to the above-mentioned effects. It should be understood that the effects of the present disclosure include all effects that may be inferred from the above description.

Although experimental examples and embodiments of the present disclosure have been illustrated and described in detail, the scope of the present disclosure is not limited thereto. It will be understood that various modifications and changes can be made by those skilled in the art without departing from the spirit and scope of the disclosure as defined by the appended claims.

What is claimed is:

1. A sample holder for performing X-ray diffraction analysis, comprising:
   a housing part comprising a side wall, a bottom plate, and an inner space partitioned by the side wall and the bottom plate, wherein an upper portion of the housing part is open;
   a cover part configured to cover the upper portion of the housing part and allow X-rays to pass therethrough; and
   a support part configured to be movable upwards and downwards in the inner space, wherein the support part comprises a substrate portion having a shape of a plate with a predetermined area, the substrate portion being configured to receive a sample placed thereon,
   wherein the side wall further comprises a placement groove recessed to a predetermined depth and disposed at an upper edge of the side wall,
   wherein the sample holder further comprises a coupling part coupled to the placement groove and configured to shield the inner space,
   wherein the cover part is interposed between the coupling part and the placement groove, and
   wherein the sample holder further comprises a first sealing member interposed between the placement groove and the coupling part.

2. The sample holder of claim 1, wherein the cover part further comprises a polyimide film.

3. The sample holder of claim 1, wherein the support part further comprises:
   a head member configured to support the substrate; and
   a shaft member having a rod like shape extending in a longitudinal direction from a first end to a second end, wherein the first end is connected to a lower portion of the head member and the second end is inserted into a coupling groove recessed in the bottom plate or formed to penetrate the bottom plate.

4. The sample holder of claim 3, wherein the shaft member is configured to be screw-coupled to the coupling groove, thereby enabling the support part to be movable upwards and downwards.

5. The sample holder of claim 3, wherein:
   the coupling groove is configured to penetrate the bottom plate,
   the shaft member is exposed to the outside through the coupling groove, the shaft member further comprising a plurality of holes formed therethrough in a direction perpendicular to the longitudinal axis of the shaft member, and
   the sample holder further comprises a fixing part coupled to at least one hole of the plurality of holes of the shaft member to thereby fix the shaft member.

6. The sample holder of claim 1, wherein the sample holder further comprises:
   a gas inlet configured to have one end passing through one side of the side wall to communicate with the inner space, wherein the gas inlet is configured to provide gas to the inner space; and
   a gas outlet configured to have one end passing through the other side of the side wall to communicate with the inner space, wherein the gas outlet is configured to discharge the gas of the inner space to the outside.

7. The sample holder of claim 6, wherein the sample holder further comprises:
   a second sealing member positioned at a connection portion between the gas inlet and the side wall; and
   a third sealing member positioned at a connection portion between the gas outlet and the side wall.

8. An X-ray diffraction analysis method using a sample holder comprising: a housing part comprising a side wall, a bottom plate, and an inner space partitioned by the side wall and the bottom plate, wherein an upper portion of the housing part is open; a cover part configured to cover the upper portion of the housing part and allow X-rays to pass therethrough; and a support part configured to be movable upwards and downwards in the inner space, wherein the support part comprises a substrate portion having a shape of a plate with a predetermined area, the substrate portion being configured to receive a sample placed thereon, wherein the X-ray diffraction analysis method comprises:
   placing a sample on the support part;
   adjusting a height of the support part so that a surface of the sample is in contact with an inner surface of the cover part;
   generating a flow of an inert gas in the inner space by allowing the inert gas to flow into the inner space and discharging the inert gas from the inner space; and
   irradiating the sample with an incident beam,
   wherein the side wall further comprises a placement groove recessed to a predetermined depth and disposed at an upper edge of the side wall,
   wherein the sample holder further comprises a coupling part coupled to the placement groove and configured to shield the inner space,
   wherein the cover part is interposed between the coupling part and the placement groove, and
   wherein the sample holder further comprises a first sealing member interposed between the placement groove and the coupling part.

9. The X-ray diffraction analysis method of claim 8, wherein the sample comprises an electrochemical cell, and the electrochemical cell is placed on the support part so that a plane or a cross-section of the electrochemical cell faces an upper side of the sample holder.

10. The X-ray diffraction analysis method of claim 8, wherein a size of the incident beam is 50 μm to 800 μm.

* * * * *